(12) United States Patent
Muderis et al.

(10) Patent No.: US 12,491,012 B2
(45) Date of Patent: Dec. 9, 2025

(54) BONE COMPRESSION DEVICE

(71) Applicant: Osseointegration International B.V., Ruurlo (NL)

(72) Inventors: Munjed Al Muderis, Nort Ryde (AU); Franciscus Theodorus Peter Verhaegh, Doesburg (NL)

(73) Assignee: Osseointegration International B.V., Ruurlo (NL)

( * ) Notice: Subject to any disclaimer, the term of this patent is extended or adjusted under 35 U.S.C. 154(b) by 204 days.

(21) Appl. No.: 18/002,279

(22) PCT Filed: Jul. 1, 2021

(86) PCT No.: PCT/NL2021/050413
§ 371 (c)(1),
(2) Date: Dec. 19, 2022

(87) PCT Pub. No.: WO2022/005284
PCT Pub. Date: Jan. 6, 2022

(65) Prior Publication Data
US 2023/0346436 A1    Nov. 2, 2023

(30) Foreign Application Priority Data
Jul. 3, 2020    (NL) .................................... 2025982

(51) Int. Cl.
*A61B 17/72*    (2006.01)
*A61B 17/68*    (2006.01)
(Continued)

(52) U.S. Cl.
CPC ...... *A61B 17/7225* (2013.01); *A61B 17/7291* (2013.01); *F16B 7/14* (2013.01);
(Continued)

(58) Field of Classification Search
None
See application file for complete search history.

(56) References Cited

U.S. PATENT DOCUMENTS

| | | | |
|---|---|---|---|
| 5,505,734 A | 4/1996 | Caniggia et al. | |
| 2005/0055025 A1* | 3/2005 | Zacouto ............... | A61F 2/3609 623/22.14 |

(Continued)

FOREIGN PATENT DOCUMENTS

| | | | |
|---|---|---|---|
| BE | 1019689 A3 | 10/2012 | |
| EP | 2464300 B1 * | 8/2014 | ......... A61B 17/7225 |
| WO | WO-2011116158 A2 * | 9/2011 | ......... A61B 17/7216 |

*Primary Examiner* — Eduardo C Robert
*Assistant Examiner* — Anna V. Little
(74) *Attorney, Agent, or Firm* — Ipsilon USA—NLO

(57) ABSTRACT

Bone compression device with a primary body (2) having a primary bone fixation pin assembly (4, 5) extending at an angle to the longitudinal axis (A), and a secondary body (3) having a secondary bone fixation pin assembly (6, 7) extending at an angle to the longitudinal axis (A). The secondary body (3) is positioned in the inner bore (2a) and moveable with respect to the primary body (2) over an adjustment range. The primary body (2) comprises a guide pin (8) and the secondary body (3) comprises a guide slot (9) having an inner guide slot (9a), the guide pin (8) extending through the guide slot (9) and in contact with the inner guide slot (9a) during operation. An adjustment assembly (10) is provided which is connected to the primary body (2) and secondary body (3) for mutual adjustment thereof along the longitudinal axis (A).

14 Claims, 4 Drawing Sheets

(51) Int. Cl.
*A61B 17/86* (2006.01)
*F16B 7/14* (2006.01)
*F16B 7/18* (2006.01)

(52) U.S. Cl.
CPC ........ *F16B 7/182* (2013.01); *A61B 2017/681* (2013.01); *A61B 17/725* (2013.01); *A61B 17/8605* (2013.01)

(56) References Cited

U.S. PATENT DOCUMENTS

| | | | |
|---|---|---|---|
| 2007/0213725 A1* | 9/2007 | Hack | A61B 17/7225 606/62 |
| 2009/0254088 A1* | 10/2009 | Soubeiran | A61B 17/7216 606/63 |
| 2011/0054473 A1 | 3/2011 | Brigido | |
| 2012/0215222 A1* | 8/2012 | Yapp | A61B 17/7291 606/57 |
| 2013/0041414 A1* | 2/2013 | Epperly | A61B 17/7225 606/310 |
| 2014/0114311 A1* | 4/2014 | Pool | A61B 17/8872 606/62 |
| 2017/0027624 A1* | 2/2017 | Wilson | B23K 26/08 |
| 2018/0132900 A1* | 5/2018 | Fening | A61B 17/7016 |

* cited by examiner

BONE COMPRESSION DEVICE

FIELD OF THE INVENTION

The present invention relates to a bone compression device, e.g. utilized as an ankle bone nail, fixable to separate bone parts, and having two parts which can move relative to another in an axial direction. The bone compression device is used to provide sustained compression between separate bone parts e.g. for use during (ankle) bone fusion treatment.

BACKGROUND ART

Joint compression is utilized in medicine e.g. for (subtalar) arthrodesis (artificial induction of joint ossification between two bones), which requires compression and rigid immobilization of the associated bones/bone parts. Various fixation options are known, including single screw fixation, 2- or 3 screw fixation, staples, and external fixation. Various types of screws have been used, including lag screws, tapered screws, variable pitch screws, etc.

US patent publication US2011/0004212 discloses an intramedullary medical device arranged to provide sustained compressive forces across a bone fusion site, despite bone resorption processes moving bone parts towards each other. In an embodiment a pre-loaded assembly is used in the device having shape memory metal (e.g. nitinol) material to maintain tension between two bone parts during an extended time period, even when the bone parts move towards each other, e.g. due to resorption processes. The working distance of the assembly is in the order of mm (1.8-4.0 mm, depending on the length of the device). It is noted that the embodiments disclosed relate to devices having a complex structure, and the use of shape memory material such as nitinol material causes additional costs of the device.

US patent publication U.S. Pat. No. 5,505,734 discloses a lockable intramedullary nail for e.g. treating hemurus fractures. In an embodiment, a spring is used in the nail for adjusting the compression in the implanted nail. Furthermore, a sleeve is provided with a through hole for the proximal locking of the nail, the through hole being able to translate along a pin in a position facing a slot, and an inwardly curved tooth is provided at one end of the device to engage a guide groove and allow the through hole to be correctly positioned relative to the slot.

US patent application US 2011/054473 discloses an intramedullary nail arranged to provide compression across a bone arthrodesis site to be stabilised and fused. The intramedullary nail comprises a proximal section, a distal section and a compression bolt to join the proximal section to the distal section and provide the required compression once implanted. In an embodiment, a plurality of notches and tabs are used to align the proximal section with the distal section.

SUMMARY OF THE INVENTION

The present invention seeks to provide a bone compression device for hind foot or subtalar joint fusion, based on a bone compression device comprising a secondary body positioned in the inner bore of a primary body. As an alternative the present invention embodiments of such a device can be indicated with the term subtalar fusion nail, or hind foot fusion nail.

According to the present invention, a bone compression device is provided, with a longitudinal axis, comprising a primary body extending along the longitudinal axis, having an inner bore with a primary internal diameter and a primary bone fixation pin assembly extending at an angle to the longitudinal axis, and a secondary body extending along the longitudinal axis, having an outer diameter smaller than the primary internal diameter and a secondary bone fixation pin assembly extending at an angle to the longitudinal axis, wherein the secondary body is positioned in the inner bore and moveable with respect to the primary body (e.g. by thread engagement between an outer and inner screw thread) over an adjustment range. The primary body comprises a guide pin positioned perpendicular to the longitudinal axis, the secondary body comprises a guide slot having an inner guide surface, the guide pin extending through the guide slot and in contact with the inner guide surface during operation. The bone compression device further comprises an adjustment assembly connected to the primary body and secondary body for mutual adjustment thereof along the longitudinal axis.

The present invention embodiments have the advantage that it offers a simple structure of low complexity and minimal dimensions, allowing for placement in the foot or ankle, and bone fusion of the small bones therein. E.g., a subtalar joint may be fused by joining the talus to the calcaneus, or in a further embodiment which crosses the subtalar joint and ankle joint, furthermore tibia to talus fixing can be achieved (as hind foot nail). In addition, it provides a simpler solution for providing sustained compression in bone fusion surgery, and offers possibility for adjustment of the sustained compression after being applied.

In a further aspect, the present invention relates to a method for inserting a bone compression device according to any one of the embodiments described herein.

SHORT DESCRIPTION OF DRAWINGS

The present invention will be discussed in more detail below, with reference to the attached drawings, in which FIG. 1 shows a cross-sectional view of a bone compression device for foot or ankle fusion, according to an embodiment of the present invention;

DESCRIPTION OF EMBODIMENTS

Foot fusion is a recognised and reliable surgical technique used to treat injuries relating to foot arthritis, caused by, for example, cartilage wear-and-tear damage, or a fracture that did not heal correctly. Foot fusion involves joining two bones on either side of a painful, arthritic joint, allowing the bones to permanently fuse. This prevents movement at the fusion site and in doing so, relieves pain. In similar fashion, ankle fusion can be used to treat ankle arthritis by permanent fusion of the tibia to the talus.

In foot or ankle fusion surgery, a plurality of screws, plates, staples and/or a combination thereof, are typically used to join and compress the arthritic bones together at the bone fusion site, and thereby the arthritic bones are tightly fixed in a predetermined position. However, this configuration is still susceptible to changes in the foot or ankle as it heals, such as settling and resorption processes that can move arthritic bone parts, and thus, the compression across the bone fusion site may not be sustained over time. As such, it is desirable to provide sustained compression across the bone fusion site over a long time period, under very varying load conditions of the foot or ankle.

Nevertheless, devices and techniques are known in the art to provide sustained compression in foot and/or ankle fusion surgery. For example, a device may have a shape memory alloy component that adapts to moving arthritic bone parts, thereby keeping sustained compression across the bone fusion site.

However, there are still many drawbacks to using such devices. They often require a complex structure having many parts with a pre-determined assembly. Such devices also tend to have a lengthy structure, which may not be suitable for small bones present in the foot or ankle. Furthermore, using shape memory alloys can prove to be quite costly, making manufacturing costs very expensive. As such, there is a need in the art to overcome these drawbacks, and provide a device of a simpler, smaller structure, with lower costs and reliable operation.

The present invention embodiments provide a bone compression device for foot or ankle fusion, providing a simpler solution to provide sustained compression across a bone fusion site, and of a smaller structure suitable for use on smaller bones in the foot or ankle. Furthermore, the present invention embodiments allow for immediate weight bearing postoperatively.

Figure 1:
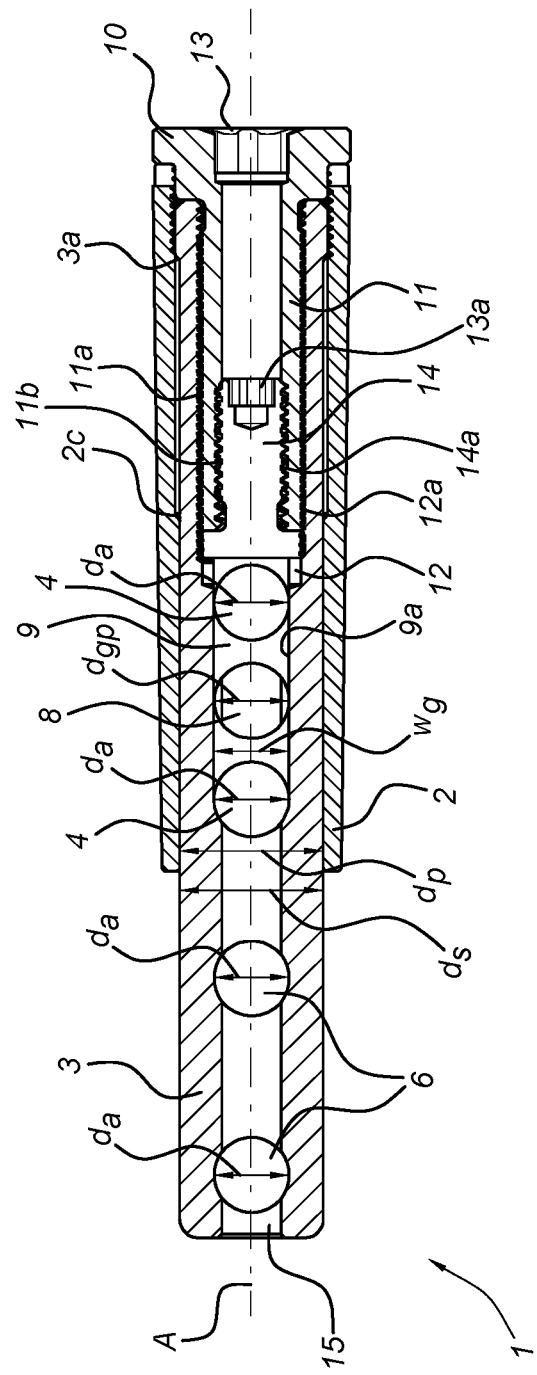

FIG. 1 shows a cross-sectional view of a bone compression device 1 suitable for foot or ankle fusion, according to an exemplary embodiment of the present invention. The bone compression device 1 comprises a primary body 2 (or calcaneal segment in case of a subtalar joint nail embodiment) extending along a longitudinal axis A, having an inner bore 2a (see FIG. 2) with a primary internal diameter $d_p$, and a secondary body 3 (or talar segment in case of a subtalar joint nail embodiment) extending along the longitudinal axis A, having an outer diameter ds, wherein the secondary body 3 is positioned in the inner bore 2a and movable with respect to the primary body 2 over an adjustment range. This allows, for example, the secondary body 3 to smoothly move away from or towards the primary body 2 over the adjustment range. The primary body 2 comprises a guide pin 8 positioned perpendicular to the longitudinal axis A, and the secondary body 3 comprises a guide slot 9, wherein the guide pin 8 extends through the guide slot 9 during operation. The guide pin 8 may comprise a cylindrical body, and the guide slot 9 may comprise a long, narrow aperture. Further, the guide slot 9 has an inner guide surface 9a.

The combination of the guide slot 9, the guide pin 8 positioned perpendicular to the axis A, the guide pin 8 extending through the guide slot 9 and in contact with the inner guide surface 9a, correctly aligns the movement of the secondary body 3 with respect to the primary body 2, where the trajectory of the moving secondary body 3 is parallel to the longitudinal axis A, i.e. the secondary body 3 can move with respect to the primary body 2 with a linear direction along the longitudinal axis A with no misalignment. Further, the combination of the guide slot 9, and the guide pin 8 extending through the guide slot 9, prevents mutual rotation between the primary body 2 and the secondary body 3 (over the longitudinal axis A).

In a further embodiment, the primary body 2 has a conical shaped outer surface. In the exemplary embodiments shown in FIGS. 1, 2 and 3, the primary body has a tapered outer surface, wherein the outer diameter of the primary body 2 e.g. tapers from 11 mm to 10 mm. This conical shaped or tapered outer surface allows to provide the bone compression device with a high post-operative stability, e.g. when positioned in a bore provided in the calcaneus of a patient. The secondary body 3 has an outer diameter of e.g. 8 mm, which allows proper fitting and fixation of the secondary body 3 in a patient's talar bone.

In a specific embodiment, the guide pin 8 has a diameter $d_{gp}$ and the guide slot 9 has a width $w_g$, where the diameter $d_{gp}$ of the guide pin 8 is less than width $w_g$ of the guide slot 9. The guide pin 8 can easily slot into the guide slot 9, allowing a good sliding movement of the secondary body 3 with respect to the primary body 2 along the longitudinal axis. In a further embodiment, the width $w_g$ of the guide slot 9 is less than 70% of the outer diameter ds of the secondary body 3, e.g. less than 50%. This structure allows the secondary body 3 to have a sufficient strength that can sustain the forces generated during use (i.e. foot or ankle fusion).

Figure 3:
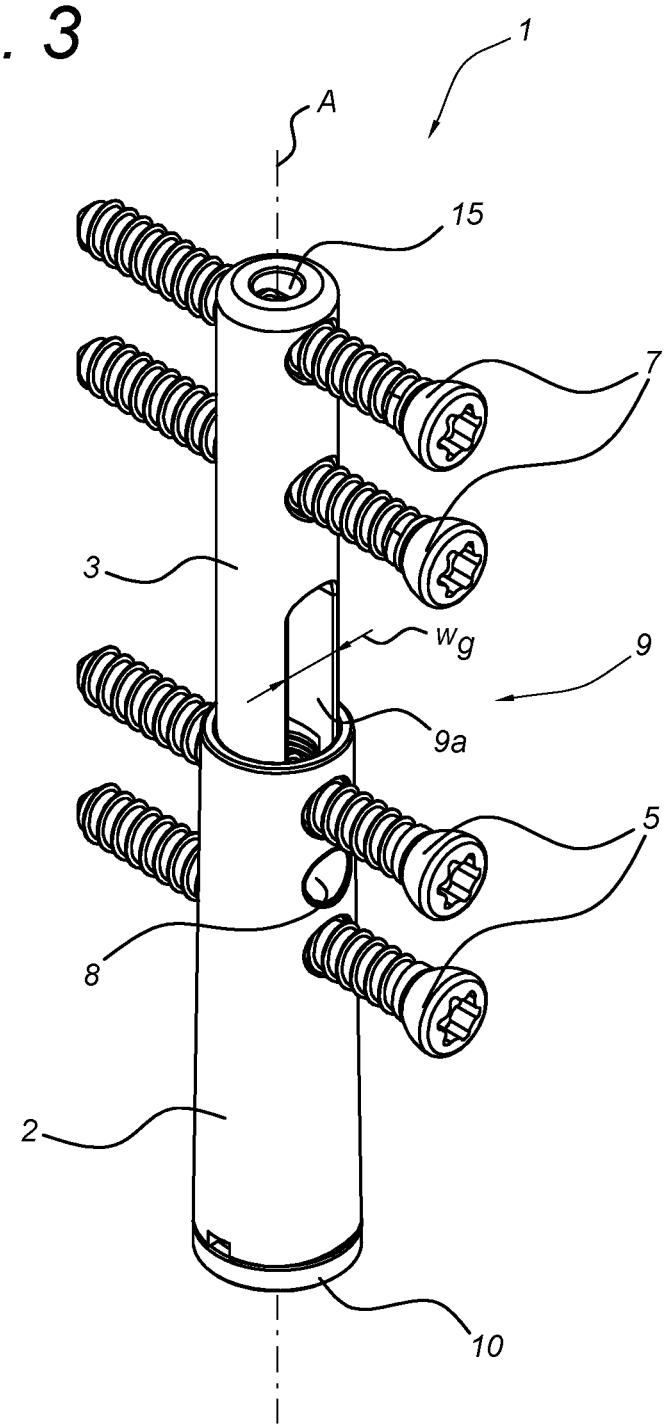
FIG. 3 shows a perspective view of the bone compression device embodiment of FIG. 2.

In a further embodiment, the bone compression device 1 comprises a cannulation channel 15 along a longitudinal direction A of the bone compression device 1, as shown in the cross sectional view of FIG. 1 (and also visible in the perspective view of FIG. 3). Such a cannulation channel 15 allows the use of a guidewire during an operation (before the fixation pins 5, 7 are placed), to properly position the secondary body 3 and the primary body 2 of the bone compression device 1 after making a bore in the respective talar bone and calcaneus. The channel width of the cannulation channel 15 is e.g. more than 3.2 mm.

Figure 2:
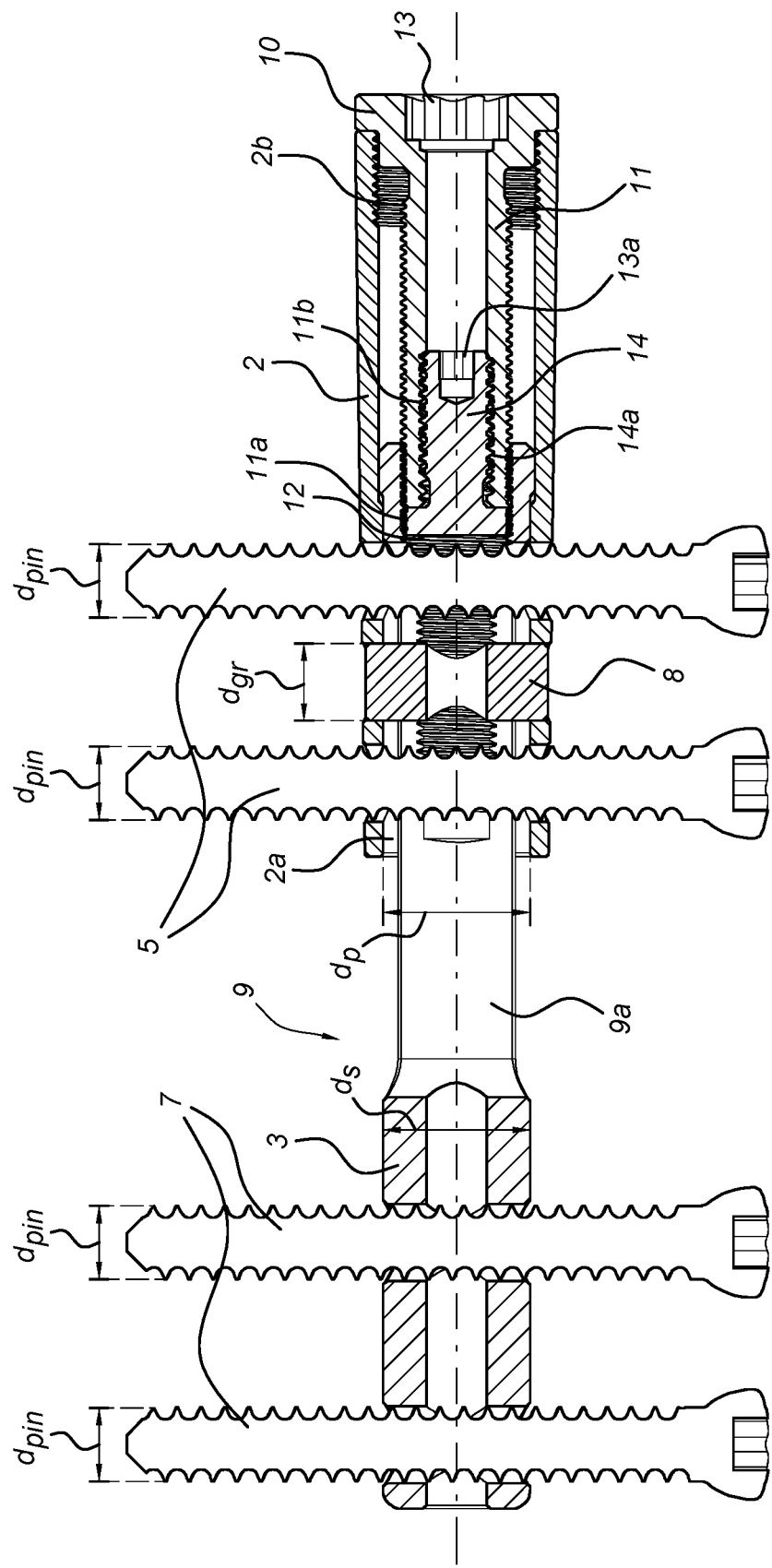
FIG. 2 shows a perpendicular cross-sectional view of the bone compression device of FIG. 1, further including fixation pins.

FIG. 2 shows a cross-sectional view of the device embodiment shown in FIG. 1, further including fixation pins 5, 7, as explained in further detail below. FIG. 3 shows a perspective view of the embodiment shown in FIG. 2.

In the embodiment shown in FIG. 2, the primary body 2 has a primary bone fixation pin assembly 4, 5 extending at an angle to the longitudinal axis, and the secondary body 3 has a secondary bone fixation pin assembly 6, 7 extending at an angle to the longitudinal axis A. The primary bone fixation pin assembly 4, 5 and secondary bone fixation pin assembly 6, 7 are arranged to connect to separate bone parts with secure attachment, e.g. using a plurality of pins extending at an angle (e.g. in a direction perpendicular) to the longitudinal axis (see FIG. 2), whereby the primary body 2 and secondary body 3 are also connected to the separate bone parts as described. For this reason, the primary bone fixation assembly 4, 5 and the secondary bone fixation pin assembly 6, 7 may comprise one or more apertures 4, 6 (see FIG. 1 cross section) and one or more pins 5, 7, wherein the one or more apertures 4, 6 accommodate the one or more pins 5, 7. In an exemplary embodiment, the pins 5, 7 are threaded pins, having an outer diameter $d_{pin}$ of e.g. 4 mm, and may be implemented as cross locking bolts. These will provide a high stability and resistance to shear and torsional forces.

In a further embodiment, the primary bone fixation pin assembly 4, 5 comprises two apertures 4 in the primary body 2 positioned on two opposite sides of the guide pin 8. This allows, for example, two pins 5 to insert through the two apertures 4, and securely attach a separate bone part to the primary bone fixation pin assembly 4, 5. In similar fashion, the secondary bone fixation pin assembly 6, 7 comprises two apertures 6 in the secondary body 3, allowing two other pins 7 to insert through two other apertures 6, and securely attach another separate bone part to the secondary bone fixation pin assembly 6, 7. Further, the apertures have a diameter da that is less than 99% of the width $w_g$ of the guide slot 9. This is to prevent any possible interference of the apertures 4 with the guide slot 9, allowing the pins 5 to easily insert through the apertures 4 and extend through the guide slot 9.

Thus, by secure attachment of separate bone parts to the primary bone fixation pin assembly 4, 5 and secondary bone fixation pin assembly 6, 7, the separate bone parts may move relative to one another by moving the secondary body 3, within the inner bore 2a, with respect to the primary body 3 over the adjustment range. In particular, this configuration allows compression of the separate bone parts by moving the secondary body 3, within the primary bore 2a, towards the primary body 2, and fixing the separate bone parts in a desired position that provides compression between the separate bone parts and thus across the bone fusion site. Further, in combination with the guide pin 8 extending through the guide slot 9, the separate bone parts may move relative to one another with a good, linear trajectory along the direction of the longitudinal axis A, with no mutual rotation between the separate bone parts, thereby preventing any twisting of the separate bone parts during the treatment.

To set and sustain the compression across the bone fusion site described in the embodiment above, according to the embodiments shown in FIGS. 1, 2 and 3, the bone compression device 1 further comprises an adjustment assembly 10, connected to the primary body 2 and secondary body 3 for mutual adjustment thereof along the longitudinal axis A. The adjustment assembly 10 is arranged to set and maintain mutual position between the primary body 2 and secondary body 3, whereby the tension between the primary body 2 and secondary body 3 is maintained, and thereby providing sustained compression across the bone fusion site. In a further embodiment, the adjustment assembly 10 comprises an adjustment head 11 having a first screw thread 11a, and the secondary body comprising an adjustment bore 12 having a secondary screw thread 12a, as shown in FIG. 1. The first screw thread 11a is e.g. an outer screw thread on an outer circumferential surface of the screw head 11, and the second screw thread 12a is an inner screw thread on an inner circumferential surface of the adjustment bore 12, and thus, a thread engagement between the first screw thread 11a and the second screw thread 12a can be engaged. In this configuration, any unintentional movement of the secondary body 3 with respect to the primary body 2 along the longitudinal axis A is prevented, due to tension forces acting on the first and second screw threads 11a, 12a. If a sufficiently high external rotational force is present to engage the thread engagement between the first screw thread 11a and the second screw thread 12a, the primary body 2 can move with respect to the secondary body 3. It is noted that the adjustment bore 12 can partially overlap the guide slot 9 in the secondary body 3 (most prominently visible in the embodiment shown in FIG. 2).

In this regard, to adjust the compression across the bone fusion site described in the embodiment above, the adjustment assembly 10 in a further embodiment further comprises an adjustment interface surface 13. The adjustment interface surface 13 is arranged to adjust the thread engagement between the first screw thread 11a and the second screw thread 12a. For this reason, the adjustment interface surface 13 may comprise a common screw drive, for example a slotted or Phillips screw drive, that allows a user to easily apply an rotational force that engages the thread engagement, allowing movement of the secondary body 3 with respect to the primary body 2 along the longitudinal axis A, thereby adjusting the compression across the bone fusion site accordingly.

As an alternative, or additional feature, the adjustment assembly 10 may further comprise a locking assembly 14, co-operating with the adjustment head 11 and adjustment bore 12 to lock the mutual position of the primary body 2 and secondary body 3, as shown in the exemplary embodiments of FIGS. 1 and 2. The locking assembly 14 may be provided with an interface surface 13a which is accessible through a bore in the adjustment head 11. The locking assembly further comprises a third (outer) screw thread 14a, co-operating with a fourth (inner) screw thread 11b on the adjustment head 11, In an exemplary embodiment, the screw thread pitch of the third screw thread 14a/fourth screw thread 11b combination, is different from the screw thread pitch of the first screw thread 11a/second screw thread 12a combination, allowing a very efficient locking mechanism.

Furthermore, the combination of the adjustment assembly 10, first screw thread 11a, second screw thread 12a (and adjustment interface surface 13) offers a simpler technique and structure to provide sustained compression, obviating the need for a shape memory alloy to provide sustained compression. In addition, the user can also adjust the magnitude of the compression force, in comparison to a shape memory alloy where the magnitude of the compression force is pre-set and cannot be adjusted. By placement of the entire bone compression device 1 in the foot or ankle, the adjustment interface surface 13 can be accessed from the exterior environment e.g. via a small hole in the foot or ankle.

That is, the magnitude of the compression between separate bone parts may be adjusted as desired after the bone compression device has been inserted, wherein the adjustment assembly may be accessed via e.g. a small hole in the foot or ankle, and wherein the adjusted compression is sustained.

In particular, a force of (up to) 2500 Newtons of compression may be applied and sustained between separate bone parts. This magnitude is much larger than the compression devices in the state-of-the-art, which are able to provide a force in the order of 600 Newtons.

The adjustment range of the mutual adjustment of the primary body 2 and secondary body along the longitudinal axis A is at least 10 mm e.g. at least 15 mm. This allows for at least 10 mm of (repeated) adjustment to maintain the compression between the separate bone parts across the bone fusion site.

In the embodiment shown in FIG. 1, the secondary body 3 and the primary body 2 are provided with respective abutment surfaces 3a, 2c, arranged to limit the movement of the secondary body 3 with respect to the primary body 2. The abutment surfaces 3a, 2c may comprises, for example, flanges or ridges that stop any further movement of the secondary body 3 with respect to the primary body 2 along the longitudinal axis A beyond the positions of the flanges or ridges 3a, 2c. In this respect, the distance between the abutment surfaces 3a, 2c essentially determines the adjustment range, and thus, the distance between the abutment surfaces 3a, 2c is e.g. at least 10 mm, and also sets a maximum length of the bone compression device. The abutment surfaces 3a, 2c also prevents the secondary body 3 moving completely out of the primary body 2 i.e. the entire secondary body 3 is withdrawn from the primary body 2.

In more general wording, the present invention embodiments as described above all relate to a bone compression device 1, suitable for foot and/or ankle fusion, with an longitudinal axis A, comprising a primary body 2 extending along the longitudinal axis A, having an inner bore 2a with a primary internal diameter $d_p$ and a primary bone fixation pin assembly 4, 5 extending at an angle to the longitudinal axis A, and a secondary body 3 extending along the longitudinal axis A, having an outer diameter ds smaller than the primary internal diameter $d_p$ and a secondary bone fixation pin assembly 6, 7 extending at an angle to the longitudinal axis, wherein the secondary body 3 is positioned in the inner bore 2a and moveable with respect to the primary body 2 over an adjustment range. The primary body 2 comprises a guide pin 8 positioned perpendicular to the longitudinal axis A, the secondary body 3 comprises a guide slot 9, the guide pin 8 extending through the guide slot 9 during operation. The bone compression device 1 further comprises an adjustment assembly 10 connected to the primary body 2 and secondary body 3 for mutual adjustment thereof along the longitudinal axis A. All the embodiments as described provide for a bone compression device 1 having a simple, yet robust structure, allowing to set and maintain a sufficient high compression force during prolonged time periods. The guide slot 9 may have an inner guide surface 9a, and the guide pin 8 extending through the guide sot 9 is in contact with the inner guide surface 9a.

The bone compression device 1 is arranged to be inserted inside the foot or ankle, wherein the bone compression device 1 is placed for the entire duration of the treatment i.e. no part of the bone compression device 1 is present in the exterior environment of the foot or ankle. In this regard, a minimum length of the bone compression device 1 is selected in the range from 50 to 90 mm, e.g. 70 mm, and a maximum length of the bone compression device 1 is selected in the range from 65 to 105 mm, e.g. 85 mm. The relative small lengths quoted provides a very compact structure of the bone compression device 1 that is suitable for bone fusion of the small bones present in the foot or ankle.

Figure 4:
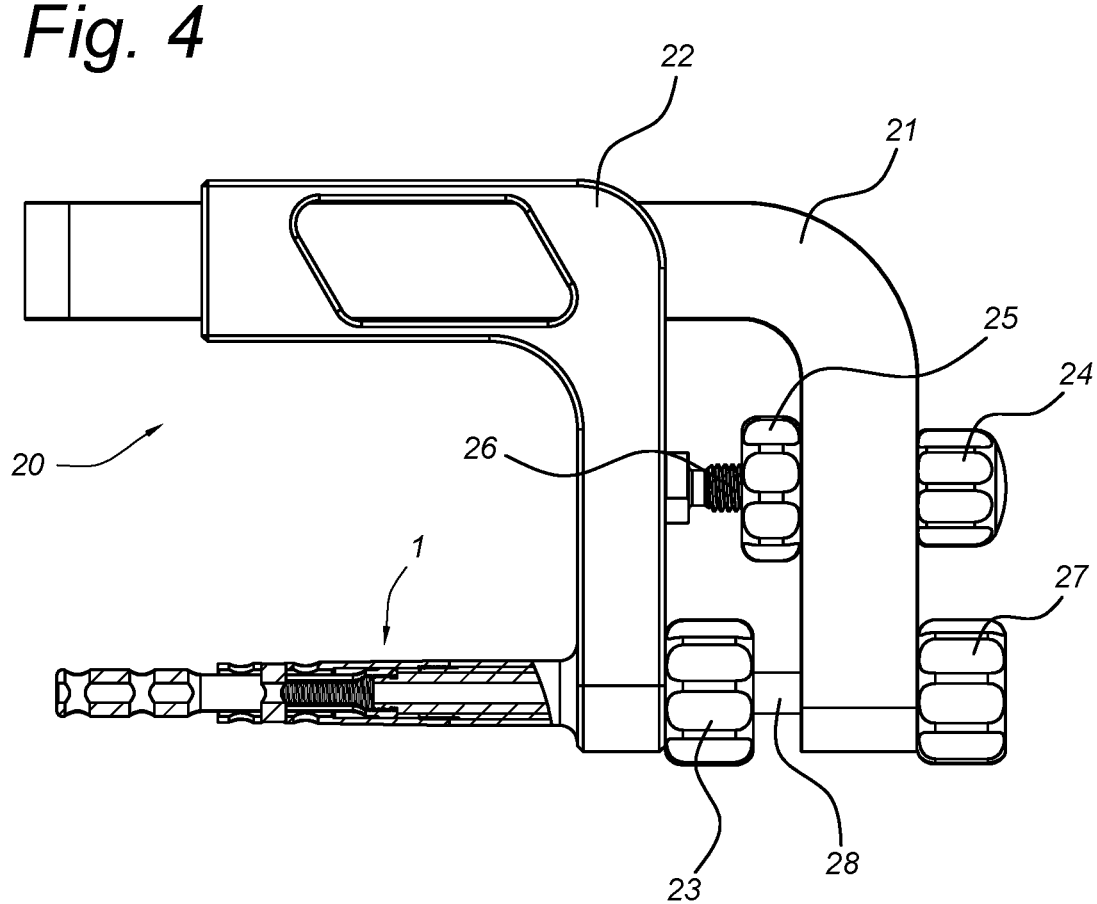
FIG. 4 shows a top view of an exemplary embodiment of an aiming and insertion jig according to the present invention.
Figure 5:
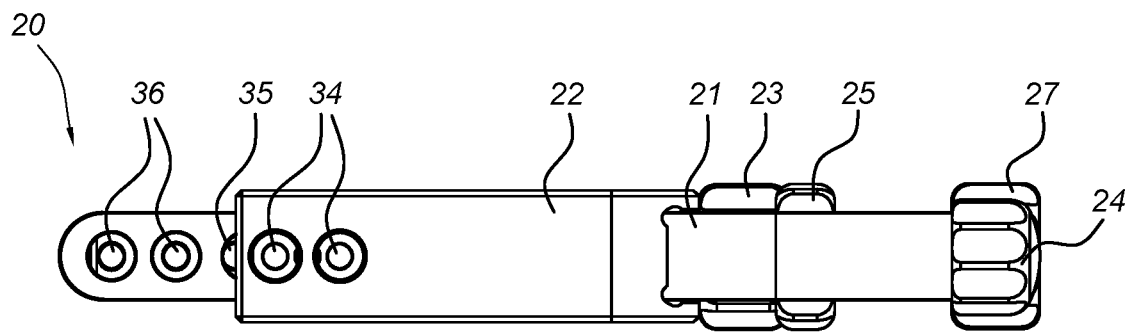
FIG. 5 shows a side view of the aiming an insertion jig of FIG. 4.

FIGS. 4 and 5 shows a top view and side view of an exemplary embodiment of an aiming and insertion jig 20, which can be used in conjunction with the bone compression device 1 embodiments as described herein. The aiming and insertion jig 20 comprises an adjustment frame 21 and a holding frame 22, both generally and similarly L-shaped, and able to move with respect to each other in a sliding manner. A bone compression device 1 can be attached to the aiming and insertion jig 20 using a connection screw 23. The adjustment frame 21 is provided with a plurality of drill guides, i.e. secondary drill guides 36 at a proximal end of the aiming and insertion jig 20, The secondary drill guides 36 are used to align with the apertures 6 of the secondary body 3. The adjustment frame 21 is furthermore provided with a slot 35, with a length to provide space for primary drill guides 34 provided in the holding frame 22. The primary drill guides 34 are used to align with the apertures 4 of the primary body 2. The straight legs of adjustment frame 21 and holding frame 22 are aligned with the longitudinal direction of the bone compression device 1 when secured to the holding frame 22 with the connection screw 23.

The mutual position of the adjustment frame 21 and holding frame 22 can be adapted using a length adjustment assembly, in this exemplary embodiment in the form of a screw knob 24, co-operating with a screw bolt 26 which is fixed to holding frame 22, and lockable by a counter nut 25. In use, the screw knob 24 also allows to change the mutual position of the primary body 2 and secondary body 3 of the bone compression device 1. Furthermore, the aiming and insertion jig 20 is provided with an adjustment knob 27, which, via a connecting rod 28 secured to the adjustment knob 27, is in connection with secondary body 3 of the bone compression device 1 when secured to the holding frame 22. Note that the adjustment assembly 10 is not present in the bone nail device 1 when the bone nail device 1 is attached to the aiming and insertion jig 20. In operation, the adjustment knob 27 is used to align the secondary drill guides 36 with the apertures 6 of the secondary body 3.

The aiming and insertion jig 20 is arranged to precisely position the bone compression device 1 in the foot or ankle, where it provides the user with a simple approach to align the separate bone parts of interest. The holding frame 22 provides the correct positioning of the bone compression device 1 across the separate bone parts (after drilling a suitable bore in the separate bone parts). Once in the correct position, the adjustment frame 21 and holding frame 22 can be used to guide drill instruments for providing the apertures 4, 6, and insert pins 5, 7 through the primary and secondary drill guides 34, 36, fixing the separate bone parts to the primary bone fixation pin assembly 4, 5 and the secondary fixation pin assembly 6, 7.

In a further aspect, the present invention provides a method for installing a bone compression device 1 according to any one of the embodiments as described herein.

In general terms, the present invention provides a method for inserting a bone compression device 1 according to any one of the embodiment described herein, comprising grafting bone material from two bone parts to be joined, providing space for the bone compression device 1, positioning the secondary body 3 of the bone compression device in one of the two bone parts and the primary body 2 in the other one of the two bone parts, affixing the primary and secondary bodies 2, 3 to the associated bone parts, applying compression to the bone compression device 1 by adjusting the mutual position of the primary body 2 and the secondary body 3, and locking the bone compression device 1. In a further embodiment, the method further comprises, before applying compression, distracting the bone compression device 1 by adjusting the mutual position of the primary body 2 and the secondary body 3, and applying grafted bone material between the two bone parts and around the bone compression device 1.

An exemplary treatment of a patient using the present invention bone compression device 1 is now described in relation to a subtalar joint fusion nail version of the bone compression device 1. The patient is positioned supine on a standard radiolucent operating table after appropriate anaesthesia has been achieved. Standard prophylatic antibiotics of 2 grams first generation cephalosporins are administered intravenously. The leg is prepped and draped using proper extremity drapes in the usual manner with a tourniquet applied but non inflated until required by the surgeon.

Through a sinus tarsi approach the posterior and middle facet of the subtalar joint is prepared with removal of all cartilage. Under image intensifier control a guide wire (e.g. having a 3.2 mm diameter) is inserted through the calcaneal tuberosity into the talar neck passing just behind the sinus tarsi. The wire is positioned to end 2-3 mm proximal to the cortical surface of the talar neck just anterior to the articular surface. Correct positioning of the guide wire is ensured with lateral and axial C-arm views.

A skin incision is made around the wire and the length of the guide wire is measured using the provided guide and the desired length of the nail can be determined by taking 10 mm off the measured length.

A 10 mm core reamer is inserted over the guide wire and impacted down to through the calcaneal cortical bone into the posterior facet articular surface. The corer is then turned clockwise 180 degrees to allow removal of the autograft core and this is removed from the corer using a specific piston disimpactor provided. The bone graft is put aside for later use. An 8 mm corer is then inserted to the desired level in the talus in a similar manner to the calcaneal corer however the corer needs to be inserted without breaching the talar dome. The bone is later used as bone graft. The talar bone graft harvesting is optional, as it can be more challenging in certain patients considering the size of the talus. This is done under C-arm control being careful not to penetrate the talar neck surface.

The calcaneal tunnel is then tapered using a specific 10/11 mm reamer that provides the desirable space for the calcaneal portion of the nail, i.e. the primary body 2 of the bone compression device 1.

The subtalar joint fusion nail 1 is then attached to the aiming and insertion jig 20. The nail 1 is inserted over the 3.2 mm guidewire using hand control and can be gently impacted with a mallet on the designated impaction area of the insertion guide until the talar end of the nail 1 (i.e. the secondary body 3) is in the desired position. The guidewire is then removed.

Two proximal locking bolts (i.e. the pins 7 of the secondary fixation pin assembly 6, 7) are inserted into the talar section 3 of the nail 1 from lateral to medial using the provided secondary drill guide 36. Using a 3.2 mm drill bit the path is prepared and the bolt length can be calculated off the drill bit. Accurate bolt length is important to ensure bicortical fixation without bolt protuberance. This is to avoid impingement of the bolt ends against the medial or lateral malleolus with ankle dorsiflexion. 2 mm bolt increments are provided to facilitate this.

The aiming and insertion jig 20 is then changed for the calcaneal fixation. The screw knob 24 on the jig 20 is tightened to "dial in" the desired nail length using C-arm control. Aim is to avoid having any part of the nail 1 protruding out of the calcaneus as this is a potential source of pain with weight bearing.

Once the desired nail position is achieved into the calcaneum then the two calcaneal 4 mm locking bolts (pins 5 of the primary fixation pin assembly 4, 5) are inserted once again ensuring bicortical fixation without bolt protuberance into the sinus tarsi or medial soft tissues.

Once proximal and distal fixation is achieved then the aiming and insertion jig 20 can be adjusted to distract the subtalar joint and through the sinus tarsi incision the harvested autograft is then impacted into the fusion site around the nail 1. Once completed then the aiming and insertion jig 20 can be removed and the compression screw (as exemplary implementation of the adjustment assembly 10) is inserted into the calcaneal end (primary body 2) of the nail 1 through the heel incision.

The implant system/bone compression device 1 can be compressed by dialing the turns using e.g. a star driver into the distal locking bolt (as exemplary implementation of part of the adjustment assembly 10) until maximum compression is achieved. Up to 15 mm of compression can be achieved. This allows capture of the graft in the fusion site and maximum stability.

Biomechanical testing has shown over 600 Nm of compression can be achieved with hand tightening using the supplied star screwdriver. This is approximately twice of what is achievable using traditional compression screws. (reference paper)

The compression is then locked in using a specific locking mechanism (as e.g. described above referring to the locking assembly 14) and the wounds are closed in layers. Compression dressings can be applied and a cam boot can also be applied.

The subtalar joint fusion nail 1 does not require routine removal but it can be removed if needed. Under a general anaesthetic the requisite leg is prepped and draped in the usual manner and a tourniquet is applied but not inflated. Under image control stab incisions are made to remove three of the four locking bolts 5, 7. One bolt 5, 7 is left in situ to provide torsional resistance when the extraction jig (can be same as the aiming and insertion jig 20) is applied.

An incision is made at the previous insertion site and any recurrent bone removed from the end of the nail 1. The compression screw (as exemplary implementation of the adjustment assembly 10) is removed using the star driver and the extraction jig is screwed into the end of the nail 1 until a tight fit is achieved. The final locking bolt 5, 7 is then removed and the nail 1 removed in a retrograde manner with the supplied backslap column and mallet.

At the surgeons discretion resorbable injectable bone substitute (Stryker Proset or Wright medical Prodense) can be inserted into the previous path of the nail 1 as a void filler and potential facilitator or bone regeneration or allograft cancellous bone can be impacted into the previous nail path to restore bone stock to the calcaneus and talus.

The present invention has been described above with reference to a number of exemplary embodiments as shown in the drawings. Modifications and alternative implementations of some parts or elements are possible, and are included in the scope of protection as defined in the appended claims.

The invention claimed is:

1. A bone compression device with a longitudinal axis, comprising:
    a primary body extending along the longitudinal axis, having an inner bore with a primary internal diameter, and a primary bone fixation pin assembly extending at an angle to the longitudinal axis,
    a secondary body extending along the longitudinal axis, having an outer diameter smaller than the primary internal diameter, and a secondary bone fixation pin assembly extending at an angle to the longitudinal axis,
    wherein the secondary body is positioned in the inner bore and moveable therethrough with respect to the primary body over an adjustment range,
    wherein the primary body comprises a guide pin positioned perpendicular to the longitudinal axis, and the secondary body comprises a guide slot comprising an aperture having an inner guide surface, the guide pin extending through the guide slot and in contact with the inner guide surface during operation, and
    an adjustment assembly connected to the primary body and secondary body for mutual adjustment thereof along the longitudinal axis,
    wherein the adjustment assembly comprises an adjustment head having a first screw thread, and the secondary body comprises an adjustment bore having a second screw thread for engagement with the first screw thread, and
    wherein the adjustment assembly further comprises a rotatable locking assembly in threaded co-operation with both the adjustment head and the adjustment bore of the secondary body to lock the mutual position of the primary body and secondary body when a required length of the bone compression device in situ is achieved;
    wherein the primary bone fixation pin assembly is arranged between the secondary bone fixation pin assembly and the adjustment head.

2. The bone compression device according to claim 1, wherein the primary body has a conical shaped outer surface.

3. The bone compression device according to claim 1, wherein the primary bone fixation pin assembly comprises two apertures in the primary body positioned on two opposite sides of the guide pin.

4. The bone compression device according to claim 1, wherein the secondary bone fixation pin assembly comprises two apertures in the secondary body.

5. The bone compression device according to claim 3, wherein a diameter of the apertures is less than 99% of a width of the guide slot.

6. The bone compression device according to claim 1, wherein a width of the guide slot is less than 70% of the outer diameter of the secondary body.

7. The bone compression device according to claim 1, wherein a diameter of the guide pin is less than a width of the guide slot.

8. The bone compression device according to claim 1, wherein the adjustment head comprises an adjustment interface surface.

9. The bone compression device according to claim 1, wherein the secondary body and the primary body are provided with respective abutment surfaces.

10. The bone compression device according to claim 1, wherein an adjustment range of the mutual adjustment of the primary body and secondary body along the longitudinal axis is at least 10 mm.

11. The bone compression device according to claim 1, wherein a minimum length of the bone compression device is selected in the range from 50 to 90 mm, and a maximum length of the bone compression device is selected in the range from 65 to 105 mm.

12. The bone compression device according to claim 1, wherein the bone compression device comprises a cannulation channel along a longitudinal direction of the bone compression device.

13. A method for inserting a bone compression device according to claim 1, comprising:
grafting bone material from two bone parts to be joined, providing space for the bone compression device,
positioning the secondary body of the bone compression device in one of the two bone parts and the primary body in the other one of the two bone parts,
affixing the primary and secondary body to the associated bone parts,
rotating the adjustment head in the adjustment bore of the secondary body and applying compression to the bone compression device by adjusting the mutual position of the primary body and the secondary body,
locking the bone compression device by rotating the locking assembly.

14. The method of claim 13, further comprising, before applying compression,
distracting the bone compression device by adjusting the mutual position of the primary body and the secondary body,
applying grafted bone material between the two bone parts and around the bone compression device.

* * * * *